(12) United States Patent
Wang et al.

(10) Patent No.: US 10,095,334 B2
(45) Date of Patent: Oct. 9, 2018

(54) TOUCH CONTROL DISPLAY DEVICE

(71) Applicants: Shenzhen Laibao Hi-Tech Co., Ltd., Shenzhen, Guangdong (CN); Chongqing Laibao Technology Co., Ltd., Beibei District, Chongqing (CN)

(72) Inventors: Shimin Wang, Guangdong (CN); Zeli Zhu, Guangdong (CN)

(73) Assignees: SHENZHEN LAIBAO HI-TECH CO., LTD., Shenzhen (CN); CHONGQING LAIBAO TECHNOLOGY CO., LTD., Chongqing (CN)

( * ) Notice: Subject to any disclaimer, the term of this patent is extended or adjusted under 35 U.S.C. 154(b) by 97 days.

(21) Appl. No.: 15/036,779

(22) PCT Filed: May 29, 2015

(86) PCT No.: PCT/CN2015/080205
§ 371 (c)(1),
(2) Date: May 13, 2016

(87) PCT Pub. No.: WO2016/086630
PCT Pub. Date: Jun. 9, 2016

(65) Prior Publication Data
US 2016/0349892 A1    Dec. 1, 2016

(30) Foreign Application Priority Data

Dec. 4, 2014  (CN) .......................... 2014 1 0728885

(51) Int. Cl.
  *G06F 3/041*  (2006.01)
(52) U.S. Cl.
  CPC ............ *G06F 3/0412* (2013.01); *G06F 3/041* (2013.01)

(58) Field of Classification Search
  CPC ............................... G06F 3/0412; G06F 3/041
  See application file for complete search history.

(56) References Cited

U.S. PATENT DOCUMENTS

2005/0274596 A1* 12/2005 Nashiki ............... H01H 13/704
  200/512
2013/0229366 A1*  9/2013 Dighde ................. G06F 3/041
  345/173

FOREIGN PATENT DOCUMENTS

| CN | 101807093 A | 8/2010 |
| CN | 103336599 A | 10/2013 |
| CN | 204288172 U | 4/2015 |

OTHER PUBLICATIONS

International search report, International application No. PCT/CN2015/080205. Dated Sep. 8, 2015. SIPO: Beijing, CN.

* cited by examiner

*Primary Examiner* — Abhishek Sarma
(74) *Attorney, Agent, or Firm* — Coats & Bennett, PLLC

(57) ABSTRACT

A touch display device includes a display panel (101), a touch panel (103), a bonding member (104), and a bonding layer (102) bonding the touch panel (101) and the display panel (102) together. The touch panel (101) includes a first functional layer (1031), the first functional layer (1031) is positioned on a surface of the display panel (103) adjacent to the bonding layer (102), the first functional layer (1031) has a first side surface (103*a*). The bonding member (104) is positioned on a periphery of the bonding layer (102), wherein the bonding member (104) is at least bonded to a portion of the first side surface (103*a*).

8 Claims, 3 Drawing Sheets

TOUCH CONTROL DISPLAY DEVICE

FIELD OF THE INVENTION

The present disclosure relates a field of panel display technology, and more particular relates to a touch control display device.

BACKGROUND OF THE INVENTION

In current consuming electronic products market, a display integrated with a touch control function becomes a development tendency of the electronic device. Touch panels have already been applied to multiple electronic devices, such as smart phone, tablet PC, notebook computer, navigator, self-service terminal, and medical facility. The touch control display device provides a humanized operation interface between user and the electronic product. User can directly operate or give an instruction via an icon displayed on the screen. It has advantages such as easy operation and user-friendly. It is convenient and efficient, and has a better user experience.

The touch control display device generally includes a touch screen and a display screen, and an adhesive layer bonding the two screens. However, in the producing procedure, based upon a requirement of assembling a terminal equipment, although the adhesive layer can bond the two screens, but an area of the display panel is generally smaller than an area of the touch panel, therefore, a gap is generally formed on a side surface of the display panel. Due to these gaps, when the touch control display device is assembled to form the terminal equipment, an overall structure of the terminal equipment is not compact, influencing a whole strength of the touch control display device. Due to these gaps, peripheral circuits are easily influenced by environment such as temperature, humidity, static electricity and so on, it is not facilitate to improve a reliability of the touch control display device.

SUMMARY OF THE INVENTION

Therefore, it is necessary to provide a touch control display device which is conductive to improve a whole strength and a structural reliability thereof.

A touch display device includes: a display panel; a touch panel comprising a first functional layer, the first functional layer having a first side surface; a bonding layer bonding the touch panel and the display panel together, the first functional layer being positioned on a surface of the display panel adjacent to the bonding layer; and a bonding member positioned on a periphery of the bonding layer, wherein the bonding member is at least bonded to a portion of the first side surface.

A touch display device includes: a display panel having a first side surface and a first peripheral edge adjacent to the first side surface; a touch panel having a first surface facing the display panel; a bonding layer bonding the touch panel and the display panel together, the first peripheral edge being adjacent to the bonding layer and including a third surface parallel to the first surface; and a bonding member positioned on a periphery of the bonding layer, wherein the bonding member is positioned between the third surface and the touch panel.

In the touch display device provided by the present disclosure, since the bonding member is introduced to a periphery of the bonding layer, or introduced to the first side surface and the second side surface of the first functional layer, the gaps on the periphery of the touch control display panel can be filled, thus the gap cannot be influenced by external environment, thereby enhancing a whole strength and a structural reliability of the touch control display device. In addition, adopting the bonding member to surround a periphery of the bonding layer and the first side surface of the display panel can solve the problem of bubbles generated by merely filling optical glue into the gap.

BRIEF DESCRIPTION OF THE DRAWINGS

These and other features of the present invention will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein.

Figure 1:
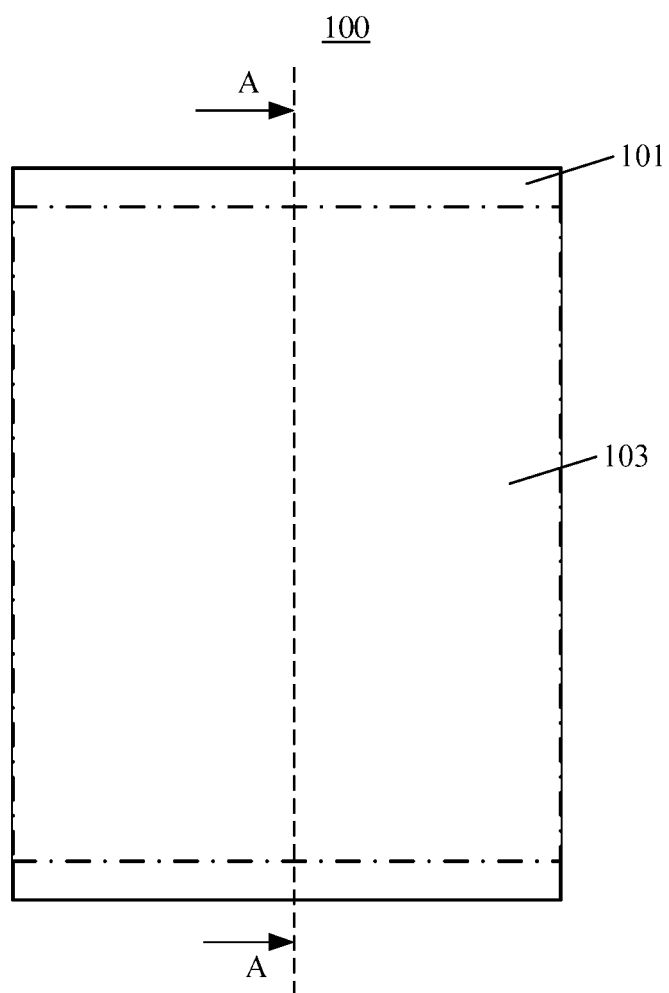
FIG. 1 is a front view of a touch control display device according to an embodiment.
Figure 2:
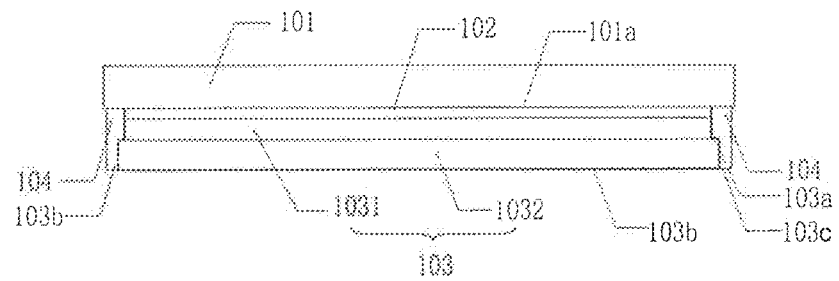
FIG. 2 is a cross-sectional view taken along line A-A of FIG. 1.

FIG. 1 shows a front view of a touch control display device according to an embodiment and FIG. 2 is a cross-sectional view taken along line A-A of FIG. 1. The touch control display device 100 includes a touch panel 101, a display panel 103, a bonding layer 102, and a bonding member 104. The touch control display device 100 of the embodiment is a borderless type device. The bonding layer 102 is positioned between the touch panel 101 and the display panel 103, and bonds the touch panel 101 and the display panel 103 together. The touch panel 101 includes a touch area and a non-touch area. A projection of the bonding layer 102 on the touch panel 101 covers at least the touch area. The bonding layer 102 is OCA (optical clear adhesive). In the embodiment, the bonding mode is a full lamination mode, i.e. the projection covers the touch area and the non-touch area. In alternative embodiments, a frame bonding mode can be adopted.

The display panel 103 includes at least a first functional layer 1031 and a second functional layer 1032. The first functional layer 1031 is opposite to the touch control panel 101 and is positioned between the second functional layer 1032 and the bonding layer 102. A projection of the first functional layer 1031 on the touch panel 101 falls within a projection of the second functional layer 1032 on the touch panel 101. The first functional layer 1031 has at least a first side surface 103*a*. In the embodiment, the first side surface 103*a* surrounds the first functional layer 1031. Because two opposite side surfaces of the touch control display panel 100 in the embodiment are non-bezel type, then the bonding member 104 is positioned on two opposite side surfaces 103a of the display panel 103. In the other embodiment, the touch control display device can be a panel having a narrow bezel or a normal bezel, the bonding member can be positioned on a periphery of the display panel.

The bonding member 104 is positioned on a periphery of the bonding layer 102, and the bonding member 104 contacts and is bonded to at least the first side surface 103a. There is no gap between the bonding member 104, the bonding layer 102 and the first side surface 103a, i.e. the bonding member 104, the bonding layer 102 and the first side surface 103a are in close contact. The touch panel 101 is provided with a first surface 101a on a side facing the display panel, the display panel is provided with a third surface 103b on a side away from the touch panel 101, and the display panel is further provided with a second side surface 103c adjacent to the first side surface 103a. The bonding member 104 is bonded to the first side surface 103a and the second side surface 103c. A side of the bonding member 104 is positioned on a side of the touch panel 101, and the bonding member 104 includes a first end extending to the first surface 101a along a direction parallel to the first side surface 103a, the opposite side extends to a plane where the third surface located, along a direction parallel to the first side surface 103a. The first end of the bonding member 104 is bonded to the first surface of the touch panel 101. A thickness of the bonding member 104 along a direction perpendicular to the first surface is equal to a summed thickness of the display panel 103 and the bonding layer 102 along the direction. The bonding member 104 possesses a certain softness, in the embodiment, the bonding member 104 is an ultraviolet curing adhesive, the ultraviolet curing adhesive surrounds the first side surface 103a and the second side surface 103c of the display panel 103. In the other embodiment, an elastic coefficient of the bonding member 104 is less than or equal to 1/10 of an elastic coefficient of the substrate. The substrate consists of a supporting base of the touch panel 101.

In the embodiment, the first function layer 1031 is a polarizer or a color filter. The second functional layer 1032 is a display medium layer or a backboard driving layer.

In the embodiment, due to the bonding member 104 on a periphery of the bonding layer 102, on the first side surface 103a and the second side surface 103c of the first functional layer, therefore, the gaps on the periphery of the touch control display panel can be filled, and the gap can not be influenced by external environment, thereby facilitating to enhance a whole strength and a structural reliability of the touch control display device 100. In addition, adopting the bonding member 104 to surround a periphery of the bonding layer 102 and the first side surface 103a of the display panel can avoid bubbles generated by merely filling optical glue into the gaps.

Figure 3:
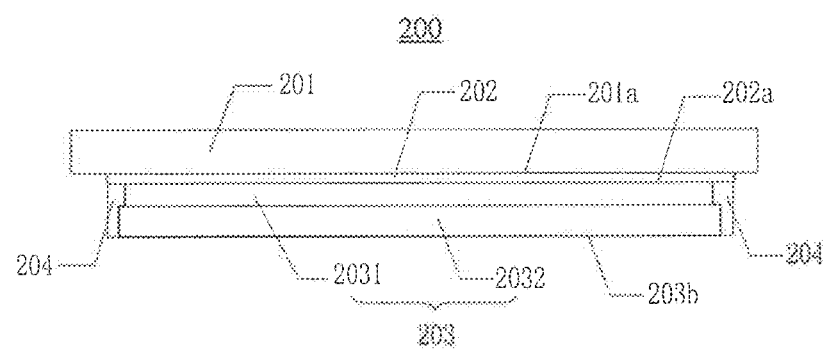
FIG. 3 is a cross-sectional view of a touch control display device according to another embodiment.

FIG. 3 shows a front view of a touch control display panel 200 according to another embodiment. The touch control display device 200 includes a touch panel 201, a display panel 203, a bonding layer 202, and a bonding member 204. The display panel 203 includes a first functional layer 2031 and a second functional layer 2032. The touch panel 201 is provided with a first surface 201a on a side facing the display panel 203, the bonding layer 202 is provided with a second surface 202a away from the touch panel 201, the first functional layer 2031 has a first side surface 203a. The second functional layer 2032 is provided with a second side surface 203c, the second side surface 203c is positioned on a side of the display panel adjacent to the first side surface 203a. The display panel 203 is provided with a third surface 203b at a side away from the touch panel 201. The bonding member 204 is bonded to the first side surface 203a and the second side surface 203c. A side of the bonding member 204 extends to the first surface 201a along a direction parallel to the first side surface 203a, an opposite side of the bonding member 204 extends to a plane where the third surface 203b located, along a direction parallel to the first side surface 203a. A thickness of the bonding member 204 along a direction perpendicular to the first surface 201a is equal to a thickness of the display panel 203 along the direction.

Figure 4:
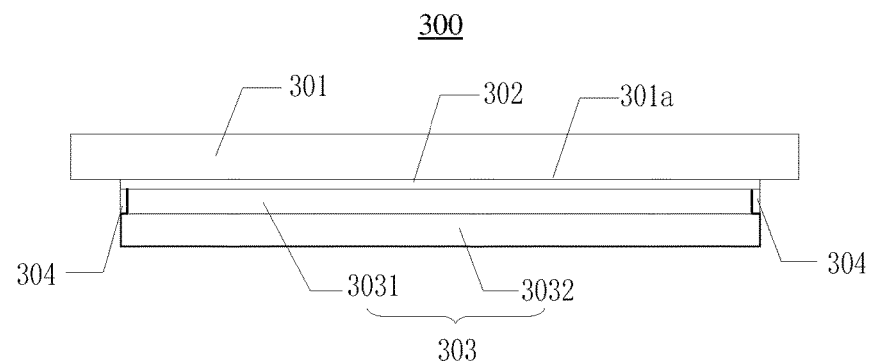
FIG. 4 is a front view of a touch control display device according to another embodiment.

Referring to FIG. 4, it shows a front view of a touch control display panel 300 according to another embodiment. The touch control display device 300 includes a touch panel 301, a display panel 303, a bonding layer 302, and a bonding member 304. The display panel 303 includes a first functional layer 3031 and a second functional layer 3032. The touch panel 301 is provided with a first surface 301a facing the display panel 303, a projection of the first functional layer 3031 on the touch panel 301 falls within the first surface 301a. A thickness of the bonding member 304 along a direction perpendicular to the first surface 301a is equal to a thickness of the first functional layer 3031.

Figure 5:
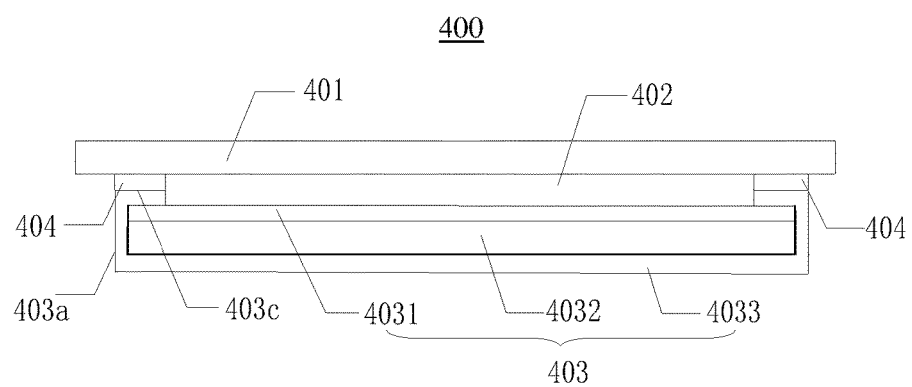
FIG. 5 is a front view of a touch control display device according to another embodiment.

Referring to FIG. 5, it shows a front view of a touch control display device 400 according to another embodiment. The touch control display device 400 includes a touch panel 401, a display panel 403, a bonding layer 402, and a bonding member 404. The touch panel 401 is provided with at least one first surface 401a facing the display panel. The display panel 403 includes a polarizer 4031, a display layer 4032 and a backlight module 4033. The backlight module 4033 is provided with a receiving space. The polarizer 4031 and the display layer 4032 are laminated in the receiving space in that order. The display panel 403 is further provided with at least one first side surface 403a and a first peripheral edge adjacent to the first side surface 403a, the first peripheral edge is adjacent to the bonding layer 402. The first peripheral edge includes a third surface 403c parallel to the first surface 401a. The third surface 403c extends from the first side surface 403a toward the bonding layer. The bonding member 404 is positioned on a periphery of the bonding layer 402, and the bonding member 404 is positioned between the third surface 403c and the touch panel 401. A thickness of the bonding member 404 is less than a thickness of the bonding layer 402.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A touch display device, comprising:
a touch panel;
a display panel comprising a first functional layer, the first functional layer having a first side surface;
a bonding layer bonding the touch panel and the display panel together, the first functional layer being positioned on a surface of the display panel adjacent to the bonding layer; and
a bonding member positioned on a periphery of the bonding layer, wherein the bonding member is at least bonded to a portion of the first side surface;
wherein the touch panel is provided with a first surface on a side facing the display panel, the display panel is provided with a third surface on a side away from the touch panel, and the display panel is further provided with a second side surface on a side adjacent to the first side surface, the bonding member is bonded to the first side surface and the second side surface, a side of the bonding member extends to the first surface along a direction parallel to the first side surface, a thickness of the bonding member along a direction perpendicular to the first surface is equal to a summed thickness of the display panel and the bonding layer along the direction.

2. The touch control display device according to claim 1, wherein the bonding member, the bonding layer, and the first side surface are in close contact.

3. The touch control display device according to claim 1, wherein the first functional layer is a polarizer or a color filter.

4. The touch control display device according to claim 1, wherein the touch panel further comprises a substrate, an elastic coefficient of the bonding member is less than or equal to $1/10$ of an elastic coefficient of the substrate.

5. The touch control display device according to claim 1, wherein the first side surface surrounds the first functional layer, the bonding member is positioned on two opposite first side surfaces of the display panel.

6. The touch control display device according to claim 1, wherein the bonding layer is an optical clear adhesive.

7. The touch control display device according to claim 1, wherein the touch panel comprises a touch area and a non-touch area, and a projection of the bonding layer on the touch panel covers at least the touch area.

8. The touch control display device according to claim 1, wherein the bonding member is an ultraviolet curing adhesive.

* * * * *